United States Patent
Oh et al.

(10) Patent No.: US 12,325,330 B2
(45) Date of Patent: Jun. 10, 2025

(54) APPARATUS CONTROLLING REGENERATIVE BRAKING FOR BATTERY CHARGING BASED ON DRIVING CONDITION, AND METHOD THEREOF

(71) Applicants: Hyundai Motor Company, Seoul (KR); Kia Corporation, Seoul (KR)

(72) Inventors: Kwang Seob Oh, Anyang-Si (KR); Ju Hoon Shin, Suwonsi (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 902 days.

(21) Appl. No.: 17/508,849

(22) Filed: Oct. 22, 2021

(65) Prior Publication Data
US 2022/0371448 A1 Nov. 24, 2022

(30) Foreign Application Priority Data
May 20, 2021 (KR) .................. 10-2021-0064935

(51) Int. Cl.
| | |
|---|---|
| *B60L 7/18* | (2006.01) |
| *B60L 7/26* | (2006.01) |
| *B60L 58/13* | (2019.01) |
| *B60W 10/26* | (2006.01) |
| *B60W 30/18* | (2012.01) |

(52) U.S. Cl.
CPC ................. *B60L 7/18* (2013.01); *B60L 7/26* (2013.01); *B60L 58/13* (2019.02); *B60W 10/26* (2013.01); *B60W 30/18127* (2013.01)

(58) Field of Classification Search
None
See application file for complete search history.

(56) References Cited

U.S. PATENT DOCUMENTS

| | | | |
|---|---|---|---|
| 2009/0112386 A1* | 4/2009 | Saitoh ................. | B60L 58/40 701/22 |
| 2020/0017097 A1* | 1/2020 | Money ................ | B60L 7/14 |
| 2022/0212542 A1* | 7/2022 | Ortmann ............. | B60T 8/321 |

FOREIGN PATENT DOCUMENTS

JP  6260308 B  1/2018

OTHER PUBLICATIONS

PDF of website accessed through archive.org wayback machine log date May 18, 2021 (Year: 2021).*

* cited by examiner

*Primary Examiner* — James J Lee
*Assistant Examiner* — Elizabeth Galyn Martinez
(74) *Attorney, Agent, or Firm* — Morgan, Lewis & Bockius LLP

(57) ABSTRACT

An apparatus of controlling regenerative braking for battery charging according to driving information may include a driving information generation device that generates the driving information of a vehicle, a controller that is configured to control regenerative braking of the vehicle according to the generated driving information, and a charging device that controls charging of a battery of the vehicle according to the controlled regenerative braking.

18 Claims, 6 Drawing Sheets

APPARATUS CONTROLLING REGENERATIVE BRAKING FOR BATTERY CHARGING BASED ON DRIVING CONDITION, AND METHOD THEREOF

CROSS-REFERENCE TO RELATED APPLICATION

The present application claims priority to Korean Patent Application No. 10-2021-0064935, filed on May 20, 2021, the entire contents of which is incorporated herein for all purposes by this reference.

BACKGROUND OF THE INVENTION

Field of the Invention

The present invention relates to an apparatus of controlling regenerative braking for battery charging according to driving information, and a method thereof.

Description of Related Art

Generally, vehicles driven based on battery power, such as electric vehicles, hybrid electric vehicles, and plug-in hybrid electric vehicles, may utilize regenerative braking to improve electricity or fuel economy. However, in specific situations such as cases that a battery is fully charged, the above-mentioned vehicles may adjust a brake only by friction braking, and thus a load on the brake may increase. Accordingly, there is a demand for a system capable of adjusting the regenerative braking depending on situations.

Furthermore, when the regenerative braking is prohibited more than necessary even though the regenerative braking is adjusted, the battery SOC required for driving may not be obtained. Accordingly, it is necessary to adjust a regenerative braking amount controlled depending on a driving condition of a vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system configured for adjusting regenerative braking depending on a situation of a vehicle.

Furthermore, various aspects of the present invention are directed to providing a system configured for adjusting the regenerative braking amount controlled depending on driving conditions of a vehicle.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an apparatus of controlling regenerative braking for battery charging according to driving information may include a driving information generation device that generates the driving information of a vehicle, a controller which is configured to control regenerative braking of the vehicle according to the generated driving information, and a charging device that controls charging of a battery of the vehicle according to the controlled regenerative braking.

Furthermore, according to various exemplary embodiments of the present invention, the driving information generation device may generate the driving information when a longitudinal acceleration value of the vehicle is less than a predetermined first value. The driving information may include slope value between a first point and a second point. The vehicle may be driven from the first point to the second point, and an elevation at the second point is higher than an elevation at the first point.

Moreover, according to various exemplary embodiments of the present invention, the slope value between the first point and the second point may be generated according to a straight-line distance value between the first point and the second point in a horizontal direction thereof and an elevation difference value between the elevation at the first point and the elevation at the second point.

Also, according to various exemplary embodiments of the present invention, the controller may prohibit the regenerative braking when the slope value between the first point and the second point is greater than a predetermined second value and an elevation difference value between the elevation at the first point and a current elevation of the vehicle is greater than a predetermined third value.

Besides, according to various exemplary embodiments of the present invention, the charging device may determine a necessary remaining state-of-charge (SOC) value of the battery of the vehicle when the regenerative braking is prohibited.

Furthermore, according to various exemplary embodiments of the present invention, the charging device may prohibit the charging of the battery of the vehicle when a depth-of-discharge (DOD) value indicating a current discharge amount of the battery is equal to or less than the determined necessary remaining SOC value of the battery, and charges the battery of the vehicle when the DOD value indicating the current discharge amount of the battery is greater than the determined necessary remaining SOC value of the battery.

Furthermore, according to various exemplary embodiments of the present invention, the vehicle may be driven from the second point to a third point, an elevation at the third point may be lower than the elevation at the second point, and the second point and the third point may be connected to each other through to one or more roads. The necessary remaining SOC value of the battery may be determined based on a greatest value among a regenerative braking count prediction value determined for each of the one or more roads.

Moreover, according to various exemplary embodiments of the present invention, the regenerative braking count prediction value determined for each of the one or more roads may be determined based on a number of curves present on each of the one or more roads, and a slope value between the second point and the third point.

Also, according to various exemplary embodiments of the present invention, the slope value between the second point and the third point may be generated according to a straight-line distance value between the second point and the third point in a horizontal direction thereof and an elevation difference value between the elevation at the second point and the elevation at the third point.

Besides, according to various exemplary embodiments of the present invention, the driving information generation device may generate the driving information based on an audio, video, navigation (AVN) system of the vehicle.

According to various aspects of the present invention, a method for controlling regenerative braking for battery charging according to driving information may include generating the driving information of a vehicle, controlling regenerative braking of the vehicle according to the generated driving information, and controlling charging of a battery of the vehicle according to the controlled regenerative braking.

Furthermore, according to various exemplary embodiments of the present invention, the generating of the driving information of the vehicle may include generating the driving information when a longitudinal acceleration value of the vehicle is less than a predetermined first value. The driving information may include slope value between a first point and a second point. The vehicle may be driven from the first point to the second point, and an elevation at the second point is higher than an elevation at the first point.

Moreover, according to various exemplary embodiments of the present invention, the slope value between the first point and the second point may be generated according to a straight-line distance value between the first point and the second point in a horizontal direction thereof and an elevation difference value between the elevation at the first point and the elevation at the second point.

Also, according to various exemplary embodiments of the present invention, the controlling of the regenerative braking of the vehicle may include prohibiting the regenerative braking when the slope value between the first point and the second point is greater than a predetermined second value and an elevation difference value between the elevation at the first point and a current elevation of the vehicle is greater than a predetermined third value.

Besides, according to various exemplary embodiments of the present invention, the controlling of the charging of the battery of the vehicle may include determining a necessary remaining SOC value of the battery of the vehicle when the regenerative braking is prohibited.

Furthermore, according to various exemplary embodiments of the present invention, the controlling of the charging of the battery of the vehicle may further include prohibiting the charging of the battery of the vehicle when a DOD value indicating a current discharge amount of the battery is equal to or less than the determined necessary remaining SOC value of the battery and charging the battery of the vehicle when the DOD value indicating the current discharge amount of the battery is greater than the determined necessary remaining SOC value of the battery.

Furthermore, according to various exemplary embodiments of the present invention, the vehicle may be driven from the second point to a third point, an elevation at the third point may be lower than the elevation at the second point, and the second point and the third point may be connected to each other through to one or more roads. The necessary remaining SOC value of the battery may be determined based on a greatest value among a regenerative braking count prediction value determined for each of the one or more roads.

Moreover, according to various exemplary embodiments of the present invention, the regenerative braking count prediction value determined for each of the one or more roads may be determined based on a number of curves present on each of the one or more roads, and a slope value between the second point and the third point.

Also, according to various exemplary embodiments of the present invention, the slope value between the second point and the third point may be generated according to a straight-line distance value between the second point and the third point in a horizontal direction thereof and an elevation difference value between the elevation at the second point and the elevation at the third point.

Besides, according to various exemplary embodiments of the present invention, the generating of the driving information of the vehicle may include generating the driving information based on an AVN system of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
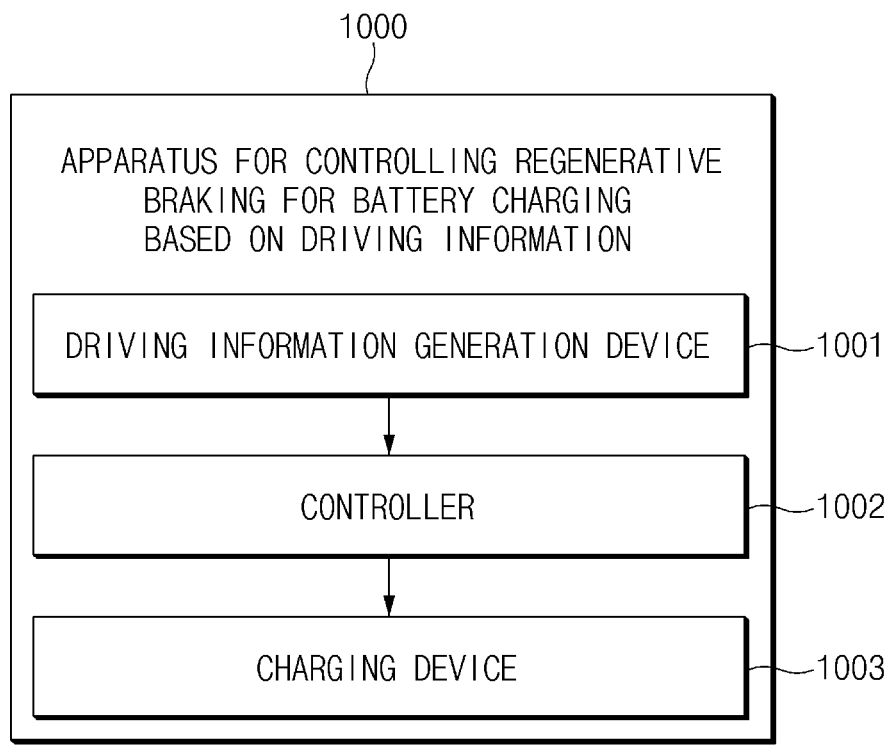
FIG. 1 illustrates an apparatus of controlling regenerative braking for battery charging according to driving information, according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In adding reference numerals to components of each drawing, it should be noted that the same components have the same reference numerals, although they are indicated on another drawing. In describing the exemplary embodiments of the present invention, detailed descriptions associated with well-known functions or configurations will be omitted when they may make subject matters of the present invention unnecessarily obscure.

In describing elements of exemplary embodiments of the present invention, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which various exemplary embodiments of the present invention belongs. It will be understood that terms used herein should be interpreted as having a meaning which is consistent with their meaning in the context of the present invention and the relevant art and will not be interpreted in an idealized or overly formal sense unless expressly so defined herein.

Hereinafter, various embodiments of the present invention will be described in detail with reference to FIGS. 1 to 6.

FIG. 1 illustrates an apparatus of controlling regenerative braking for battery charging according to driving information, according to exemplary embodiments of the present invention.

FIG. 1 illustrates an example of an apparatus 1000 (or device) for controlling regenerative braking for battery charging according to driving information, according to exemplary embodiments of the present invention. The apparatus according to exemplary embodiments of the present invention may be located inside or outside a vehicle.

A vehicle according to exemplary embodiments of the present invention may include at least one of an electric vehicle (EV), a hybrid electric vehicle (HEV), or a plug-in hybrid electric vehicle (PHEV). The vehicle according to exemplary embodiments of the present invention may generally utilize regenerative braking to improve electricity or fuel economy. However, in specific situations, the vehicles may adjust a brake only by friction braking, and thus a load on brake parts may increase. For example, when the regenerative braking is not possible because the vehicle's battery is fully charged, the brake needs to be adjusted only by friction braking, and thus the load on brake parts may increase. When the load applied to the brake parts increases, the durability of the brake may be weakened.

The apparatus according to exemplary embodiments of the present invention may properly use regenerative braking when the vehicle's brake is used, by inducing the battery to be charged/discharged based on the driving condition of the vehicle. For example, the apparatus may intentionally prohibit battery charging according to regenerative braking when braking on an uphill road and may properly use the regenerative braking on a downhill road. Accordingly, the apparatus may reduce a load on the brake. Furthermore, when the regenerative braking is prohibited, the apparatus according to exemplary embodiments of the present invention may determine a necessary remaining SOC value, which is the required maintenance level of a battery, by predicting a regenerative braking amount according to a subsequent driving condition of the vehicle.

The apparatus according to exemplary embodiments of the present invention may include a driving information generation device 1001, a controller 1002, and/or a charging device 1003. The apparatus according to exemplary embodiments of the present invention may further include one or more elements not shown in FIG. 1 to achieve the above-described scheme.

The driving information generation device according to exemplary embodiments of the present invention may generate driving information of a vehicle. The driving information generation device may generate driving information based on an Audio, Video, Navigation (AVN) system of the vehicle. The driving information according to exemplary embodiments of the present invention may be used to grasp a driving condition of a vehicle. For example, the apparatus 1000 may control regenerative braking by grasping the vehicle's driving condition based on the driving information.

The controller 1002 according to exemplary embodiments of the present invention may control the regenerative braking of the vehicle according to the generated driving information. In other words, as described above, the controller 1002 according to exemplary embodiments of the present invention may grasp the driving condition of the vehicle based on the driving information and then may control the regenerative braking of the vehicle based on the grasped driving condition to prevent a battery from being fully charged.

The charging device 1003 according to exemplary embodiments of the present invention may control the charging of a battery of the vehicle based on controlled regenerative braking. For example, when the controller 1002 prohibits the regenerative braking, the charging device 1003 may determine a necessary remaining state-of-charge (SOC) value of the vehicle's battery, and then may or may not charge the battery based on the necessary remaining SOC value.

Through the method described in FIG. 1, the apparatus 1000 according to exemplary embodiments of the present invention may control charging of the battery by appropriately controlling the regenerative braking of the vehicle. On the basis of a properly controlled and charged battery, the apparatus 1000 according to exemplary embodiments of the present invention may adjust the load applied to the brake by use of the regenerative braking in the future while the vehicle is driven, and thus may efficiently manage the durability of brake portions.

Figure 2:
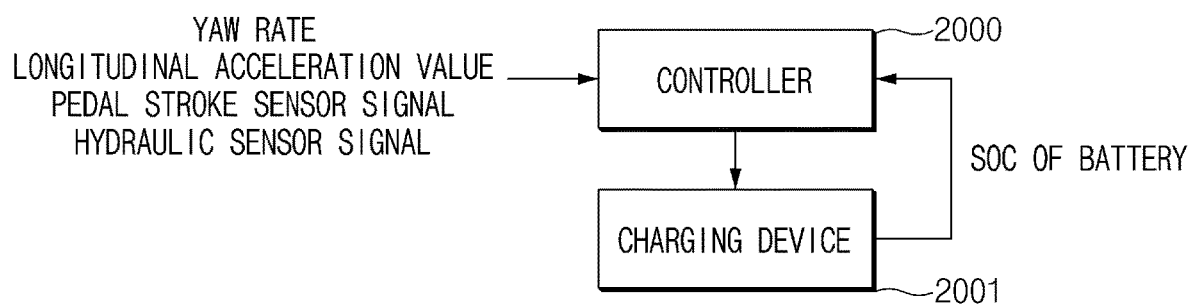
FIG. 2 is a diagram for describing regenerative braking, according to various exemplary embodiments of the present invention.

FIG. 2 is a diagram for describing regenerative braking, according to exemplary embodiments of the present invention.

FIG. 2 is a diagram for describing regenerative braking (the regenerative braking described with reference to FIG. 1), according to exemplary embodiments of the present invention. As described above in FIG. 1, a vehicle (e.g., EV, HEV, or PHEV) may obtain braking power by use of regenerative braking as well as friction braking while driving braking.

The regenerative braking according to exemplary embodiments of the present invention may be controlled by a controller 2000. The controller 2000 corresponds to the controller 1002 described above in FIG. 1. In accordance with embodiments, the charging of a battery according to the regenerative braking may be performed by a charging device 2001. The charging device 2001 corresponds to the charging device 1003 of FIG. 1.

The controller according to exemplary embodiments of the present invention may control a brake of a vehicle based on the vehicle's yaw rate, longitudinal acceleration value, pedal stroke sensor signal, and/or hydraulic sensor signal.

The yaw rate according to exemplary embodiments of the present invention may indicate a speed at which a vehicle's rotation angle changes with respect to a vertical line passing through the center portion of the vehicle. The pedal stroke sensor signal according to exemplary embodiments of the present invention may be generated in a response to the vehicle's driver manipulating a brake pedal. The longitudinal acceleration value according to exemplary embodiments of the present invention may indicate an acceleration value based on the driving direction of the vehicle. That is, a case that the longitudinal acceleration value is less than 0 may indicate that the vehicle is being braked. The hydraulic pressure sensor signal according to exemplary embodiments of the present invention may be a signal indicating the hydraulic pressure delivered to a hydraulic pressure device of a brake based on the pressure detected by a pedal stroke sensor.

The controller 2000 according to exemplary embodiments of the present invention may further consider the regenerative braking when controlling the brake of the vehicle. The regenerative braking amount according to exemplary embodiments of the present invention may be determined based on the SOC value of a vehicle battery. That is, the vehicle according to exemplary embodiments charges a battery based on the regenerative braking, and thus may not perform the regenerative braking when the battery is fully charged. Accordingly, the controller 2000 may grasp the SOC value of a battery. Only when the battery is not fully charged, the controller 2000 may control a brake further in consideration of the regenerative braking.

Through the method described with reference to FIG. 2, the apparatus according to exemplary embodiments of the present invention may control the vehicle's brake. Besides, as described above, in addition to physical friction braking that occurs based on the driver's pedal stroke, the apparatus may control the brake based on regenerative braking based on the SOC value of the battery when a vehicle is braked.

Figure 3:
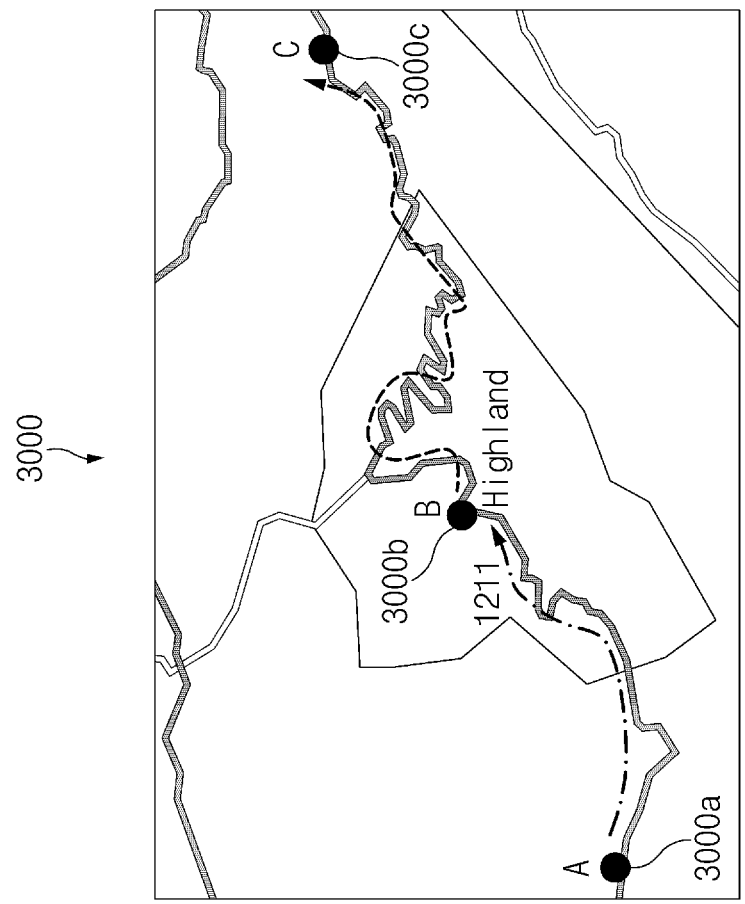
FIG. 3 is a diagram for describing a first point, a second point, and a third point according to various exemplary embodiments of the present invention.
Figure 3:
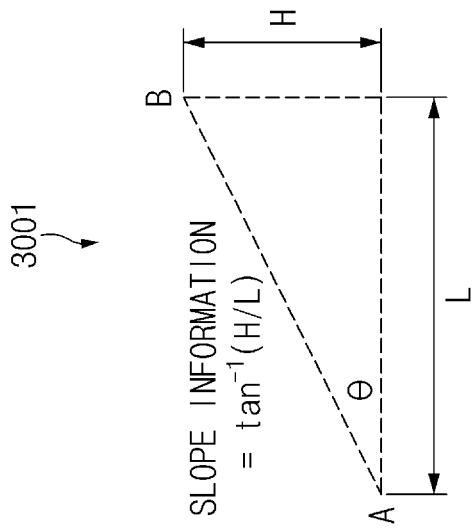

FIG. 3 is a diagram for describing examples of a first point, a second point, and a third point, according to exemplary embodiments of the present invention.

Reference numeral 3000 illustrates examples of the first point, the second point, and the third point, according to exemplary embodiments of the present invention.

Referring to reference numeral 3000, a vehicle according to exemplary embodiments of the present invention may sequentially be driven via a first point 3000a, a second point 3000b, and a third point 3000c. In other words, the first point may be a point indicating the vehicle's start location. The second point may be a point indicating the waypoint of the vehicle. The third point may be a point indicating the final location of the vehicle. The first point, the second point, and the third point may be automatically determined based on an AVN system described above with reference to FIG. 1 or may be determined by a driver of the vehicle.

An elevation at the second point according to exemplary embodiments of the present invention may be higher than an elevation at the first point or an elevation at the third point. That is, the second point may be a point having the highest elevation from among the first to third points. Accordingly, when the vehicle is driven from the first point to the second point, the vehicle may be driven on an uphill road. Furthermore, when the vehicle is driven from the second point to the third point, the vehicle may be driven on a downhill road.

As described above with reference to FIG. 1, the apparatus according to exemplary embodiments of the present invention may intentionally prohibit battery charging according to regenerative braking when a vehicle is braked on an uphill road and may properly use the regenerative braking on a downhill road. Accordingly, the apparatus may reduce a load on the brake. That is, when it is predicted, based on driving information, that a vehicle is currently driven on an uphill road and then enters a downhill road, the apparatus may prohibit regenerative braking when a vehicle is braked on an uphill road.

The apparatus according to exemplary embodiments of the present invention may determine whether to prohibit the regenerative braking, based on the slope information between the first point and the second point and a difference value between the elevation at the first point and a current elevation of the vehicle, which are included in the driving information.

Reference numeral 3001 illustrates an example of a method of determining slope information included in the driving information (the driving information described in FIG. 1), according to exemplary embodiments of the present invention.

As described above with reference to FIG. 1, the apparatus according to exemplary embodiments of the present invention may generate the driving information of a vehicle and then may control the regenerative braking based on the generated driving information. For example, as described above with reference to FIG. 1, the apparatus may intentionally prohibit the regenerative braking when a vehicle is braked on an uphill road, and then may suitably use the regenerative braking on a downhill road. The apparatus according to exemplary embodiments of the present invention may control the regenerative braking based on the slope information included in the driving information.

The slope information according to exemplary embodiments of the present invention may include slope information between the first point and the second point and slope information between the second point and the third point.

Referring to reference numeral 3001, according to various exemplary embodiments of the present invention, the slope information between the first point and the second point may be generated based on a straight-line distance value (L value) between the first point and the second point and a difference value (H value) between the elevation at the first point and the elevation at the second point. For example, the slope information may be determined as "tan$\wedge$−1(L/H value)". According to various exemplary embodiments of the present invention, the slope information between the second point and the third point may also be determined in the same manner described above. That is, as a value indicated by the slope information is great, a difference between elevations of points is great.

An apparatus according to exemplary embodiments of the present invention may control the regenerative braking of a vehicle based on the vehicle's driving information by use of the first to third points and slope information, which are described in FIG. 3. That is, the driving condition of the vehicle may be grasped through the parameters described in FIG. 3.

Figure 4:
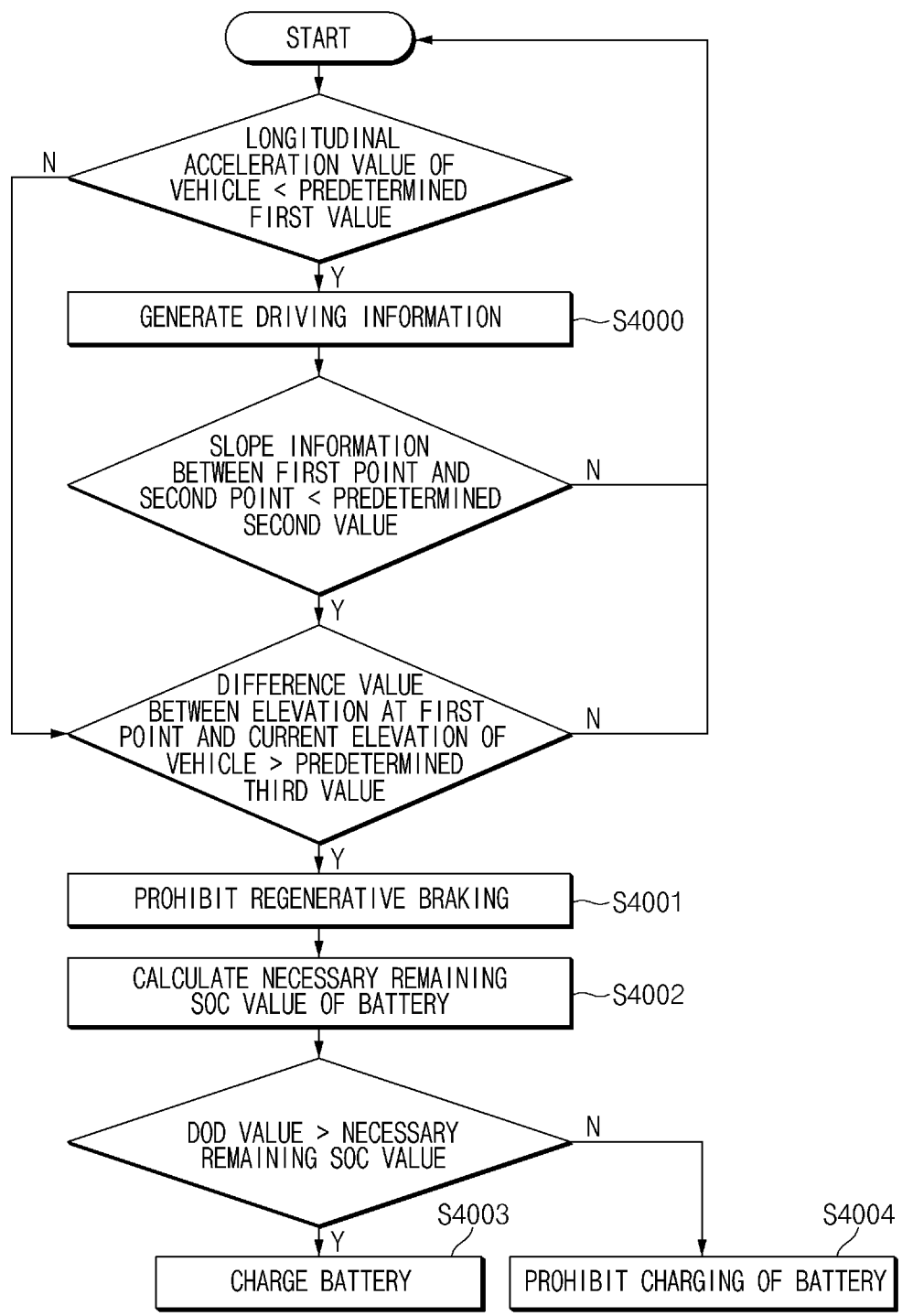
FIG. 4 is a flowchart illustrating an example of a process of controlling regenerative braking for battery charging according to driving information, according to various exemplary embodiments of the present invention.

FIG. 4 is a flowchart illustrating an example of a process of controlling regenerative braking for battery charging according to driving information, according to exemplary embodiments of the present invention.

FIG. 4 illustrates an example of a method (or process) for controlling regenerative braking for battery charging according to driving information, according to exemplary embodiments of the present invention. An apparatus described in FIG. 1, FIG. 2, and FIG. 3 may perform a method described with reference to FIG. 4.

A driving information generation device (the driving information generation device 1001 of FIG. 1) according to exemplary embodiments of the present invention may generate driving information in a response to an event that a longitudinal acceleration value of a vehicle is less than a predetermined first value (S4000). As described above in FIG. 2, a case that the longitudinal acceleration value is less than 0 may indicate that the vehicle is being braked. That is, the above-described predetermined first value may be 0. That is, the driving information generation device according to exemplary embodiments of the present invention may generate driving information in a response to an event that a vehicle is being braked.

The detailed description of driving information is the same as or similar to that described above in FIG. 1, FIG. 2, and FIG. 3. That is, the driving information may include slope information between the first point and the second point. The vehicle according to exemplary embodiments of the present invention is driven from the first point to the second point, and the elevation at the second point may be higher than the elevation at the first point.

A controller (the controller 1002 of FIG. 1) according to exemplary embodiments of the present invention may prohibit regenerative braking in a response to an event that the slope information between the first point and the second point is greater than a predetermined second value, and a difference value between the elevation at the first point and a current elevation of the vehicle is greater than a predetermined third value (S4001). According to various exemplary embodiments of the present invention, the predetermined second value and the predetermined third value may be determined by a system or may be determined by a driver of the vehicle.

That is, the apparatus according to exemplary embodiments of the present invention may determine whether to prohibit the regenerative braking, in consideration of slope information of a currently-driving road and the elevation of a current vehicle. That is, when a slope of a road on which a vehicle is currently driven is not less than a specific value and the elevation of the current vehicle is not less than a specific height from the elevation at the start point, the apparatus may prohibit the regenerative braking.

The charging device (the charging device 1003 of FIG. 1) according to exemplary embodiments of the present invention may determine a necessary remaining SOC value of the battery of the vehicle in a response to an event that the regenerative braking is prohibited (S4002). The detailed description of the necessary remaining SOC value is the same as or similar to that described above with reference to FIG. 1. That is, the apparatus according to exemplary embodiments may, in advance, determine an SOC value of the battery to be charged through the regenerative braking later. For example, the apparatus may, in advance, determine the SOC value of the battery to be charged later through the regenerative braking on a downhill road, and then may currently prohibit the regenerative braking by the determined SOC value.

A charging device according to exemplary embodiments of the present invention may charge the battery of the vehicle in a response to an event that a depth-of-discharge (DOD) value indicating the current discharge amount of the battery is greater than the determined necessary remaining SOC value of the battery (S4003). The detailed description of the DOD value is the same as or similar to that described above with reference to FIG. 1. That is, when the current SOC value of the battery is less than the necessary remaining SOC value, the battery may be charged again through regenerative braking despite the prohibition of the regenerative braking.

The charging device according to exemplary embodiments of the present invention may prohibit the charging of the vehicle's battery in a response to an event that the DOD value indicating a current discharge amount of the battery is equal to or less than the determined necessary remaining SOC value of the battery (S4004). In other words, when the current SOC value of the battery is greater than the necessary remaining SOC value, the charging device may prohibit battery charging according to the prohibition of regenerative braking. That is, the charging device according to exemplary embodiments of the present invention may determine the SOC value of the battery, and may uniformly maintain the necessary remaining SOC value.

Through the method described in FIG. 1, the apparatus according to exemplary embodiments of the present invention may control charging of the battery by appropriately controlling the regenerative braking of the vehicle. On the basis of a properly controlled and charged battery, the apparatus according to exemplary embodiments of the present invention may adjust the load applied to the brake by use of the regenerative braking in the future while the vehicle is driven, and thus may efficiently manage the durability of brake portions.

Figure 5:
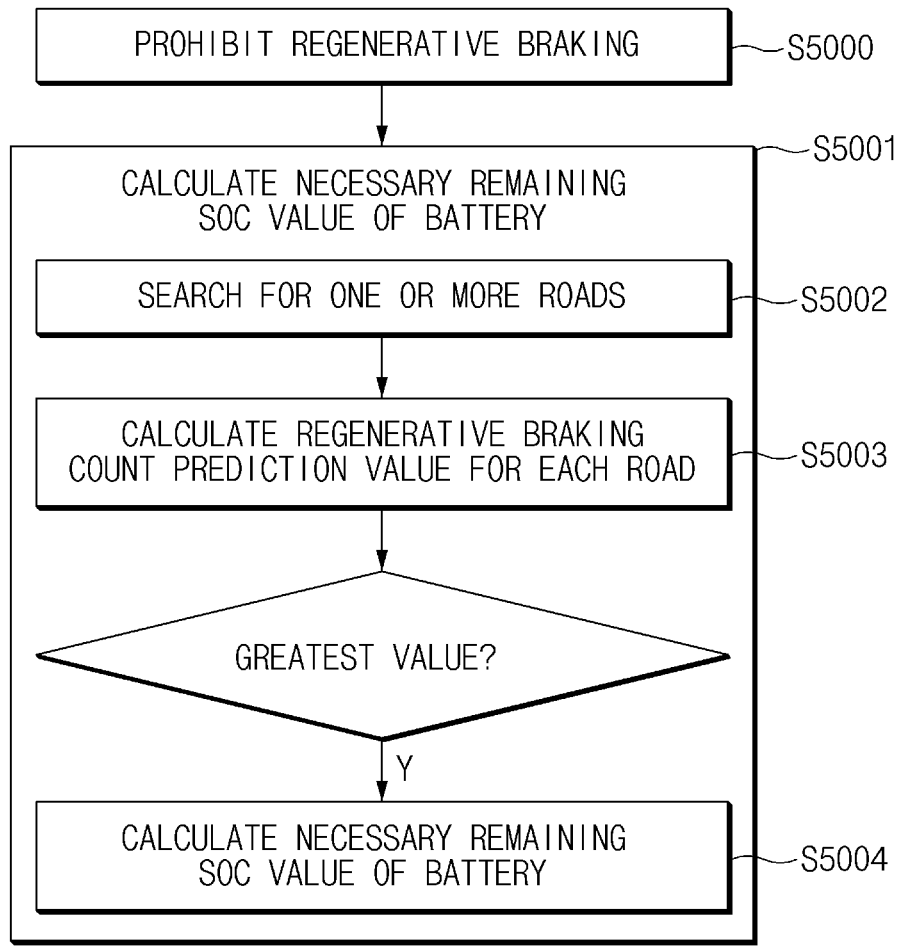
FIG. 5 is a flowchart illustrating an example of a process of determining a necessary remaining SOC value of a battery, according to various exemplary embodiments of the present invention.

FIG. 5 is a flowchart illustrating an example of a process of determining a necessary remaining SOC value of a battery, according to exemplary embodiments of the present invention.

FIG. 5 illustrates an example of a process of determining a necessary remaining SOC value of a battery, according to exemplary embodiments of the present invention. The detailed description of the necessary remaining SOC value according to exemplary embodiments of the present invention is the same as or similar to that described above with reference to FIGS. 1 and 4.

Step S5000 of prohibiting regenerative braking in FIG. 5 corresponds to Step S4001 of prohibiting regenerative braking in FIG. 4. Step S5001 of determining a necessary remaining SOC value of a battery in FIG. 5 corresponds to step S4002 of determining a necessary remaining SOC value of the battery in FIG. 4.

According to various exemplary embodiments of the present invention, the determining of the necessary remaining SOC value of the battery may include searching for one or more roads (S5002), determining a regenerative braking count prediction value for each of the one or more roads (S5003), and/or determining the necessary remaining SOC value of the battery based on the greatest value among predicted values (S5004).

As described above in FIG. 3, a vehicle according to exemplary embodiments of the present invention may sequentially be driven via a first point, a second point, and a third point. Furthermore, an elevation at the second point may be higher than an elevation at the first point or an elevation at the third point. That is, when the vehicle is driven from the second point to the third point, the vehicle may be driven on a downhill road. The apparatus according to exemplary embodiments of the present invention may determine a necessary remaining SOC value of the battery while a vehicle is driven on an uphill road, based on characteristics of a downhill road on which the vehicle will be driven.

According to various exemplary embodiments of the present invention, the second point and the third point may be connected to each other through to one or more roads. The necessary remaining SOC value according to exemplary embodiments of the present invention may be determined based on characteristics of one or more roads described above.

First of all, the apparatus according to exemplary embodiments of the present invention may search for one or more roads connecting between the second point and the third point (S5002). The apparatus according to exemplary embodiments of the present invention may search for roads based on an AVN system.

The apparatus according to exemplary embodiments of the present invention may determine a regenerative braking count prediction value for each of the roads (S5003). According to various exemplary embodiments of the present invention, the regenerative braking count prediction value of each road indicates a predicted value of the number of times that a vehicle will perform regenerative braking while being driven on each road. The regenerative braking count prediction value for each road according to exemplary embodiments of the present invention may be determined based on the number of curves, which are present on each road, and the slope information between the second point and the third point. The description of the slope information between the second point and the third point is the same as or similar to that described above with reference to FIG. 3.

The apparatus according to exemplary embodiments of the present invention may determine the necessary remaining SOC value of the battery based on the greatest value among regenerative braking count prediction values determined for each road (S5004). In other words, the apparatus may determine the necessary remaining SOC value of the battery based on a case that the vehicle will perform regenerative braking most frequently while being driven on a downhill road.

Through the method described in FIG. 1, the apparatus according to exemplary embodiments of the present invention may control charging of the battery by appropriately controlling the regenerative braking of the vehicle. On the basis of a properly controlled and charged battery, the apparatus according to exemplary embodiments of the present invention may adjust the load applied to the brake by use of the regenerative braking in the future while the vehicle is driven, and thus may efficiently manage the durability of brake parts.

Figure 6:
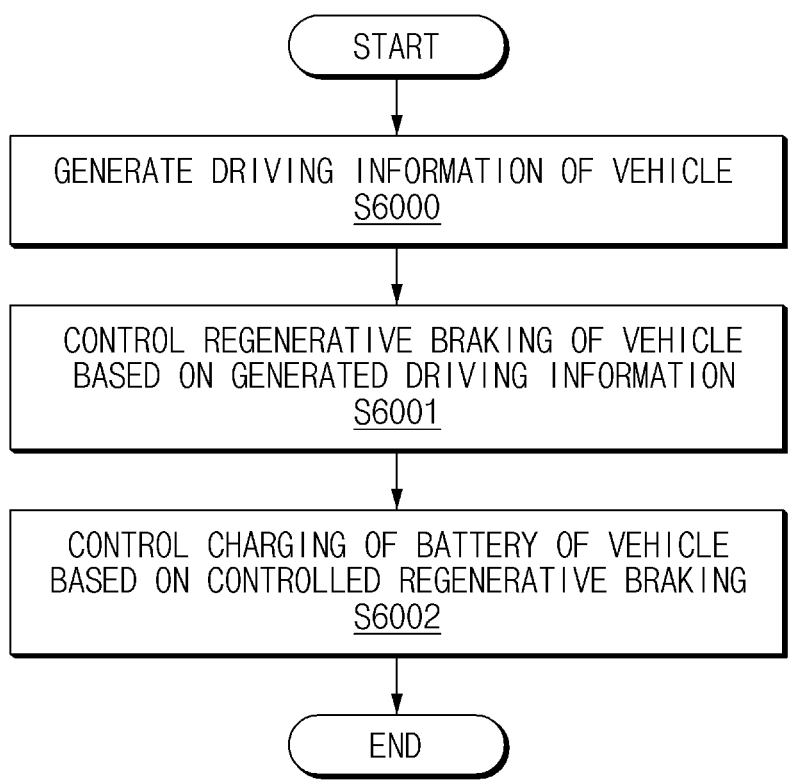
FIG. 6 is a flowchart illustrating a method of controlling regenerative braking for battery charging according to driving information, according to exemplary embodiments of the present invention.

FIG. 6 is a flowchart illustrating a method of controlling regenerative braking for battery charging according to driving information, according to exemplary embodiments of the present invention.

FIG. 4 illustrates an example of a flowchart illustrating a method (or step) for controlling regenerative braking for battery charging according to driving information, according to exemplary embodiments of the present invention. An apparatus described in FIG. 1, FIG. 2, FIG. 3, FIG. 4, and FIG. 5 may perform a method described with reference to FIG. 6.

A method according to exemplary embodiments of the present invention may include generating driving information of a vehicle (S6000), controlling regenerative braking of the vehicle according to the generated driving information (S6001), and/or controlling charging of a battery of the vehicle based on the controlled regenerative braking (S6002). A method according to exemplary embodiments of the present invention may further include one or more steps not shown in FIG. 5.

Step S6000 according to exemplary embodiments of the present invention may include generating driving information in a response to an event that the longitudinal acceleration value of the vehicle is less than a predetermined first value. The detailed description of the above-described step is the same as or similar to that described above with reference to FIG. 4. The driving information according to exemplary embodiments of the present invention may include slope information between the first point and the second point. The vehicle according to exemplary embodiments of the present invention is driven from the first point to the second point, and the elevation at the second point may be higher than the elevation at the first point. The description of the first point, the second point, and slope information is the same as or similar to that described above with reference to FIG. 2.

The slope information between the first point and the second point according to exemplary embodiments of the present invention may be generated based on a straight-line distance value between the first point and the second point in a horizontal direction thereof and an elevation difference value between an elevation at the first point and an elevation at the second point.

Step S6001 according to exemplary embodiments of the present invention may include prohibiting regenerative braking in a response to an event that the slope information between the first point and the second point is greater than a predetermined second value and an elevation difference value between the elevation at the first point and a current elevation of the vehicle is greater than a predetermined third value. The detailed description of the above-described step is the same as or similar to that described above with reference to FIG. 4.

Step S6002 according to the exemplary embodiments may include determining a necessary remaining SOC value of a battery of the vehicle in a response to an event that the regenerative braking is prohibited. The detailed description of the above-described step is the same as or similar to that described above with reference to FIG. 4 and FIG. 5.

Step S6002 according to exemplary embodiments of the present invention may further include prohibiting the charging of the vehicle's battery in a response to an event that a DOD value indicating a current discharge amount of the battery is equal to or less than the determined necessary remaining SOC value of the battery, and charging the vehicle's battery in a response to an event that the DOD value indicating the current discharge amount of the battery is greater than the determined necessary remaining SOC value of the battery. The detailed description of the above-described step is the same as or similar to that described above with reference to FIG. 4.

The vehicle according to exemplary embodiments of the present invention may be driven from the second point to the third point. An elevation at the third point may be lower than the elevation at the second point. The second point and the third point may be connected to each other through to one or more roads. The descriptions of the second point, the third point, and one or more roads are the same as or similar to those described above.

The necessary remaining SOC value of the battery according to exemplary embodiments of the present invention may be determined based on the greatest value among regenerative braking count prediction values determined for each of the one or more roads. The detailed description of the necessary remaining SOC value is the same as or similar to that described above with reference to FIG. 4 and FIG. 5.

The regenerative braking count prediction value for each road according to exemplary embodiments of the present invention may be determined based on the number of curves, which are present on each road, and the slope information between the second point and the third point. According to various exemplary embodiments of the present invention, the detailed description of the regenerative braking count prediction value for each road is the same as or similar to that described with reference to FIG. 5.

The slope information between the second point and the third point according to exemplary embodiments of the present invention may be generated based on a straight-line distance value between the second point and the third point in a horizontal direction thereof and an elevation difference value between an elevation at the second point and an elevation at the third point.

Step S6000 according to exemplary embodiments of the present invention may include generating driving information based on an AVN system of the vehicle. The detailed description of the AVN system is the same as or similar to that described above in FIG. 1.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

Therefore, embodiments of the present invention are not intended to limit the technical spirit of the present invention, but provided only for the illustrative purpose. The scope of protection of the present invention should be construed by the attached claims, and all equivalents thereof should be construed as being included within the scope of the present invention.

According to various exemplary embodiments of the present invention, it is possible to adjust regenerative braking depending on a situation of a vehicle.

Moreover, according to various exemplary embodiments of the present invention, it is possible to adjust a regenerative braking amount controlled depending on a driving condition of a vehicle.

Besides, a variety of effects directly or indirectly understood through the specification may be provided.

addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling regenerative braking for battery charging according to driving information, the apparatus comprising:
 a processor configured to generate the driving information of a vehicle;
 the processor configured to control the regenerative braking of the vehicle according to the generated driving information; and
 the processor configured to control charging of a battery of the vehicle according to the controlled regenerative braking,
 wherein the driving information includes a slope value between a first point and a second point of a road on which the vehicle travels, wherein the vehicle is driven from the first point to the second point, and an elevation at the second point is higher than an elevation at the first point, and wherein the processor is configured to prohibit the regenerative braking when the slope value between the first point and the second point is greater than a predetermined second value and an elevation difference value between the elevation at the first point and a current elevation of the vehicle is greater than a predetermined third value.

2. The apparatus of claim 1, wherein the processor is configured to generate the driving information when a longitudinal acceleration value of the vehicle is less than a predetermined first value.

3. The apparatus of claim 2, wherein the slope value between the first point and the second point is generated according to a straight-line distance value between the first point and the second point in a horizontal direction thereof and an elevation difference value between the elevation at the first point and the elevation at the second point.

4. The apparatus of claim 1, wherein the processor is configured to determine a necessary remaining state-of-charge (SOC) value of the battery of the vehicle when the regenerative braking is prohibited.

5. The apparatus of claim 4, wherein the processor is configured to prohibit the charging of the battery of the vehicle when a depth-of-discharge (DOD) value indicating a current discharge amount of the battery is equal to or less than the determined necessary remaining SOC value of the battery, and to charge the battery of the vehicle when the DOD value indicating the current discharge amount of the battery is greater than the determined necessary remaining SOC value of the battery.

6. The apparatus of claim 4, wherein the vehicle is driven from the second point to a third point of the road, an elevation at the third point is lower than the elevation at the second point, and the second point and the third point are connected to each other through to one or more roads including the road, and wherein the necessary remaining SOC value of the battery is determined based on a greatest value among a regenerative braking count prediction value determined for each of the one or more roads.

7. The apparatus of claim 6, wherein the regenerative braking count prediction value determined for each of the one or more roads is determined based on a number of curves present on each of the one or more roads, and a slope value between the second point and the third point.

8. The apparatus of claim 7, wherein the slope value between the second point and the third point is generated according to a straight-line distance value between the second point and the third point in a horizontal direction thereof and an elevation difference value between the elevation at the second point and the elevation at the third point.

9. The apparatus of claim 1, wherein the processor is configured to generate the driving information based on an audio, video, or navigation (AVN) system of the vehicle.

10. A method for controlling regenerative braking for battery charging according to driving information, the method comprising:

generating, by a processor, the driving information of a vehicle;

controlling, by the processor, the regenerative braking of the vehicle according to the generated driving information; and controlling, by the processor, charging of a battery of the vehicle according to the controlled regenerative braking, wherein the driving information includes a slope value between a first point and a second point of a road on which the vehicle travels, wherein the vehicle is driven from the first point to the second point, and an elevation at the second point is higher than an elevation at the first point, wherein the controlling of the regenerative braking of the vehicle includes:

prohibiting the regenerative braking when the slope value between the first point and the second point is greater than a predetermined second value and an elevation difference value between the elevation at the first point and a current elevation of the vehicle is greater than a predetermined third value.

11. The method of claim 10, wherein the generating of the driving information of the vehicle includes:

generating the driving information when a longitudinal acceleration value of the vehicle is less than a predetermined first value.

12. The method of claim 11, wherein the slope value between the first point and the second point is generated according to a straight-line distance value between the first point and the second point in a horizontal direction thereof and an elevation difference value between the elevation at the first point and the elevation at the second point.

13. The method of claim 10, wherein the controlling of the charging of the battery of the vehicle includes:

determining a necessary remaining SOC value of the battery of the vehicle when the regenerative braking is prohibited.

14. The method of claim 13, wherein the controlling of the charging of the battery of the vehicle further includes:

prohibiting the charging of the battery of the vehicle when a depth-of-discharge (DOD) value indicating a current discharge amount of the battery is equal to or less than the determined necessary remaining SOC value of the battery; and charging the battery of the vehicle when the DOD value indicating the current discharge amount of the battery is greater than the determined necessary remaining SOC value of the battery.

15. The method of claim 13, wherein the vehicle is driven from the second point to a third point of the road, an elevation at the third point is lower than the elevation at the second point, and the second point and the third point are connected to each other through to one or more roads including the road, and wherein the necessary remaining SOC value of the battery is determined based on a greatest value among a regenerative braking count prediction value determined for each of the one or more roads.

16. The method of claim 15, wherein the regenerative braking count prediction value determined for each of the one or more roads is determined based on a number of curves present on each of the one or more roads, and a slope value between the second point and the third point.

17. The method of claim 16, wherein the slope value between the second point and the third point is generated according to a straight-line distance value between the second point and the third point in a horizontal direction thereof and an elevation difference value between the elevation at the second point and the elevation at the third point.

18. The method of claim 10, wherein the generating of the driving information of the vehicle includes:
generating the driving information based on an audio, video, or navigation (AVN) system of the vehicle.

* * * * *